United States Patent
Singh et al.

(10) Patent No.: US 7,606,856 B2
(45) Date of Patent: Oct. 20, 2009

(54) METHODS, SYSTEMS, AND COMPUTER PROGRAM PRODUCTS FOR PRESENTING TOPICAL INFORMATION REFERENCED DURING A COMMUNICATION

(75) Inventors: Munindar P. Singh, Cary, NC (US); Mona P. Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 672 days.

(21) Appl. No.: 11/164,077

(22) Filed: Nov. 9, 2005

(65) Prior Publication Data
US 2007/0106747 A1    May 10, 2007

(51) Int. Cl.
*G06F 15/16* (2006.01)
(52) U.S. Cl. .......................... 709/202; 709/204; 704/9; 707/10
(58) Field of Classification Search ................. 709/202, 709/204; 704/9; 707/10
See application file for complete search history.

(56) References Cited

U.S. PATENT DOCUMENTS

| | | | |
|---|---|---|---|
| 6,205,342 B1 | 3/2001 | Oakes et al. | |
| 6,230,134 B1 | 5/2001 | Kynast et al. | |
| 6,360,201 B1 | 3/2002 | Lewis et al. | |
| 6,411,683 B1 | 6/2002 | Goldberg et al. | |
| 6,418,328 B1 | 7/2002 | Shon | |
| 6,473,621 B1 | 10/2002 | Heie | |
| 6,577,324 B1 | 6/2003 | Palmer et al. | |
| 6,606,101 B1 | 8/2003 | Malamud et al. | |
| 6,714,214 B1 | 3/2004 | DeMello et al. | |
| 6,721,704 B1 | 4/2004 | Strubbe et al. | |
| 6,775,358 B1 | 8/2004 | Breitenbach et al. | |
| 6,910,003 B1 * | 6/2005 | Arnold et al. | 704/4 |
| 7,099,870 B2 * | 8/2006 | Hsu et al. | 707/10 |
| 7,130,885 B2 * | 10/2006 | Chandra et al. | 709/206 |
| 7,253,817 B1 * | 8/2007 | Plantec et al. | 345/473 |
| 7,324,972 B1 * | 1/2008 | Oliver et al. | 705/40 |
| 2001/0023192 A1 | 9/2001 | Hagane | |
| 2001/0034244 A1 | 10/2001 | Calder et al. | |
| 2001/0044326 A1 | 11/2001 | Shibuya | |
| 2002/0124053 A1 * | 9/2002 | Adams et al. | 709/216 |

(Continued)

FOREIGN PATENT DOCUMENTS
WO    WO 02078299    10/2002

(Continued)

OTHER PUBLICATIONS

JP 2003-186897 (Aruze Corp) Apr. 7, 2003 (abstract). [online] [retrieved on Sep. 26, 2005] Retrieved from: <URL: http://www19.ipdl.ncipi.go.jp/PA1/cgi-bin/PA1DETAIL>, 2 pages.

*Primary Examiner*—Firmin Backer
*Assistant Examiner*—Keyvan Emdadi

(57) ABSTRACT

Methods, systems, and computer program products are disclosed for presenting topical information referenced during a communication. A topic key phrase is received during a communication between a first party and a second party. A topic descriptor associated with the topic key phrase is identified. A topic descriptor weight associated with the identified topic descriptor is determined. A topic descriptor presentation threshold is determined based on a relationship between the first party and the second party. The topic descriptor weight is compared with the determined topic descriptor presentation threshold. The topic descriptor is presented based on the comparison.

34 Claims, 5 Drawing Sheets

U.S. PATENT DOCUMENTS

| | | | |
|---|---|---|---|
| 2002/0138582 A1* | 9/2002 | Chandra et al. | 709/206 |
| 2002/0160805 A1 | 10/2002 | Laitinen et al. | |
| 2002/0174188 A1 | 11/2002 | Clark et al. | |
| 2003/0032447 A1 | 2/2003 | Bulthuis | |
| 2003/0130894 A1* | 7/2003 | Huettner et al. | 705/14 |
| 2003/0206189 A1 | 11/2003 | DeMello et al. | |
| 2004/0008828 A1 | 1/2004 | Coles et al. | |
| 2004/0048636 A1 | 3/2004 | Doble | |
| 2004/0067777 A1 | 4/2004 | Salmon | |
| 2004/0082839 A1* | 4/2004 | Haugen | 600/300 |
| 2004/0088423 A1* | 5/2004 | Miller et al. | 709/229 |
| 2004/0093382 A1* | 5/2004 | Kulkarni | 709/206 |
| 2004/0143667 A1* | 7/2004 | Jerome | 709/228 |
| 2004/0203646 A1 | 10/2004 | Rudd et al. | |
| 2005/0118986 A1 | 6/2005 | Barton et al. | |
| 2005/0159137 A1 | 7/2005 | Ramirez et al. | |
| 2006/0069749 A1* | 3/2006 | Herz et al. | 709/219 |
| 2006/0218577 A1* | 9/2006 | Goodman et al. | 725/32 |
| 2007/0106724 A1* | 5/2007 | Gorti et al. | 709/204 |
| 2007/0275740 A1* | 11/2007 | Deutsch et al. | 455/466 |
| 2008/0052214 A1* | 2/2008 | Martinez et al. | 705/37 |

FOREIGN PATENT DOCUMENTS

| | | |
|---|---|---|
| WO | WO 2004029831 | 4/2004 |

\* cited by examiner

METHODS, SYSTEMS, AND COMPUTER PROGRAM PRODUCTS FOR PRESENTING TOPICAL INFORMATION REFERENCED DURING A COMMUNICATION

TECHNICAL FIELD

The subject matter described herein relates to communication. More particularly, the subject matter described herein relates to presenting topical information referenced during a communication.

BACKGROUND

Communication devices are widely used and come in many forms, such as telephones, mobile phones, personal digital assistants (PDA), computers, and the like. While such devices are always becoming more sophisticated, they have remained limited in terms of providing helpful information during a communication. For example, during a communication, a reference may be made by one of the parties to the communication to a person, place, project, meeting, product, customer record, and the like. There is often additional information available about the reference either stored on the communication device or accessible to the communication device. It would be helpful if a communication device could recognize a reference and present additional information for use by either of the parties to the communication.

Accordingly, there exists a need for methods, systems, and computer program products for presenting topical information referenced during a communication.

SUMMARY

In one aspect of the subject matter disclosed herein, a method is disclosed for presenting topical information referenced during a communication. A topic key phrase is received during a communication between a first party and a second party. A topic descriptor associated with the topic key phrase is identified. A topic descriptor weight associated with the identified topic descriptor is determined. A topic descriptor presentation threshold is determined based on a relationship between the first party and the second party. The topic descriptor weight is compared with the determined topic descriptor presentation threshold. The topic descriptor is presented based on the comparison.

In another aspect of the subject matter disclosed herein, a method is disclosed for presenting topical information referenced during a communication. A topic key phrase is received during a communication between a first party and a second party. A topic descriptor associated with the topic key phrase is presented to the first party. The topic descriptor has an associated topic descriptor weight. A preference for sending the topic descriptor to the second party is received from the first party. The topic descriptor is sent from the first party to the second party based on the received first party preference. The topic descriptor weight is adjusted based on the received preference for sending the topic descriptor.

In another aspect of the subject matter disclosed herein, a system is disclosed for presenting topical information referenced during a communication. The system includes means for communicating with a remote endpoint via a communication network; means for recognizing a topic key phrase during a communication between a first party and a second party; means for storing topic descriptors; means for storing information about the communication; means for identifying a topic descriptor associated with the recognized topic key phrase, for determining a topic descriptor weight associated with the identified topic descriptor, for determining a topic descriptor presentation threshold based on a relationship between the first party and the second party, and for comparing the topic descriptor weight with the determined topic descriptor presentation threshold; and means for presenting the topic descriptor in conjunction with the descriptor management processor based on the comparison.

In another aspect of the subject matter disclosed herein, a system is disclosed for presenting topical information referenced during a communication. The system includes a communication interface for communicating with a remote endpoint via a communication network; a topic key phrase recognizer for recognizing a topic key phrase during a communication between a first party and a second party; a topic database for storing topic descriptors; a communication information database for storing information about the communication; a descriptor management processor for identifying a topic descriptor associated with the recognized topic key phrase in the topic database, for determining a topic descriptor weight associated with the identified topic descriptor, for determining a topic descriptor presentation threshold based on a relationship between the first party and the second party retrieved from the communication information database, and for comparing the topic descriptor weight with the determined topic descriptor presentation threshold; and a user interface for presenting the topic descriptor in conjunction with the descriptor management processor based on the comparison.

In another aspect of the subject matter disclosed herein, a system is disclosed for presenting topical information referenced during a communication. The system includes a communication interface for communicating with a remote endpoint via a communication network; a topic key phrase recognizer for recognizing a topic key phrase during a communication between a first party and a second party; a descriptor management processor for determining a topic descriptor associated with the topic key phrase, the topic descriptor having an associated topic descriptor weight; and a user interface for presenting to the first party the topic descriptor based on the associated weight and for receiving a preference from the first party for sending the topic descriptor to the second party. The descriptor management processor adjusts the topic descriptor weight based on the received preference for sending the topic descriptor.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Figure 1:
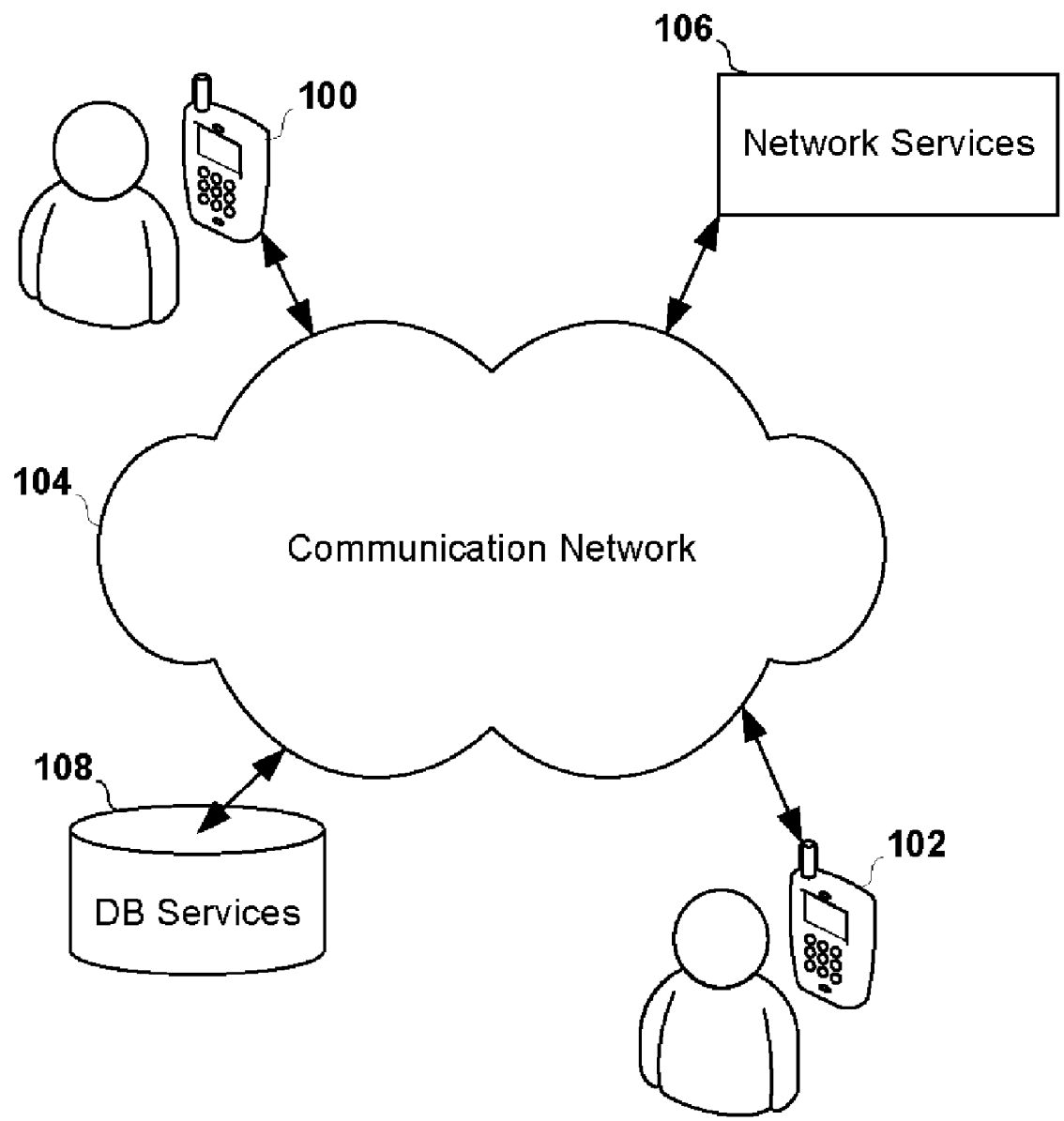
FIG. 1 is a block diagram illustrating a communication between a first party and a second party via a communication network.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

A "computer-readable storage medium" is the subset of computer-readable media that can store the program for use by or in connection with the instruction execution system, apparatus, or device. The computer-readable storage medium can be, for example but not limited to, an electronic, magnetic, optical, electromagnetic, or semiconductor system, apparatus, device, or storage medium that can store the program. More specific examples (a non exhaustive list) of the computer-readable storage medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed.

The subject matter disclosed herein describes methods, systems, and computer program products for enabling the effective exchange of information about various topics that may dynamically emerge during a communication, such as during a call or during a messaging exchange. During such a communication, many references to abstract or real things, such as people, places, projects, meetings, products, customer records, and the like, are often made. Generally speaking, such references are typically nouns or noun phrases in natural language and are referred to herein as "topics" or "topic key phrases." Topic key phrases are often not unique in natural language. However, a communication device, such as a phone, can have a wealth of information that could be tapped for resolving potential ambiguities while enhancing the productivity of the communication device users.

It is often necessary or helpful to review topical information when composing a message, when participating in a phone call, or when one party is otherwise engaged in a communication with another party. Further, this information can be selected and sent to the party to whom the message is being sent or with whom one is conversing. For example, imagine that you are talking to someone on your phone and you mention "Mike" in one of your sentences, as in "I asked Mike" or "Why don't you talk to Mike?" The other party doesn't immediately know which Mike you are referring to. If you want to be clear about what you are saying, you would need to be precise about which Mike you are referring to. Additionally, to make the information actionable (as is often crucial in a business setting), you may have to provide information about how Mike can be contacted and so on. Using the information stored in your phone, or accessible to your phone, the additional information can be provided to the other party. For example, based on a recorded voice tag on your phone for one or more Mikes or based on speech recognition, the phone can figure out that you are referencing one of a set of people called Mike (because there is a match with the names in your phone book). The phone can display a list of names, as in Mike H., Mike W., and so on, potentially augmented with some distinguishing information, such as their e-mail addresses or work organizations. You can then select Mike H., if he is the one you are talking about. If the person you are talking to has some questions about Mike, some useful facts would be ready at hand. If the other person has further questions or if you are suggesting that they contact Mike or have suggested to Mike that he contact them, then it would further help if the information you have on Mike could be forwarded to them.

In another aspect, when you are composing a message: text, voice clip, or e-mail, the same information can become available to you, and you can decide whether to send it along. For example, you could say, "while you are at CTIA, look up Mike Q. of Nokia" and attach the information you can share about Mike Q., so the other party can see what he looks like, call him up, or send him a message to schedule a meeting.

FIG. 1 is a block diagram illustrating a communication between a first party 100 and a second party 102 via a communication network 104. Each party includes a communication device, such as a mobile phone, a PDA, a computer, or any other communication-enabled device. The communication network 104 can include wireless communication components, wired communication components, or a combination thereof, and may communicate via one or more known protocols. A network services component 106 can also be associated with the communication network 104 to provide network related services, such as connectivity, data access, content, and the like. A database services component 108 may also be associated with the communication network 104 for providing access to data. For example, the topic related information discussed above and other information related to a communication between the first party 100 and the second party 102 may be accessed at the database services component 108 via the communication network 104. Such information may also be stored locally on a communication device 102, 104.

Figure 2:
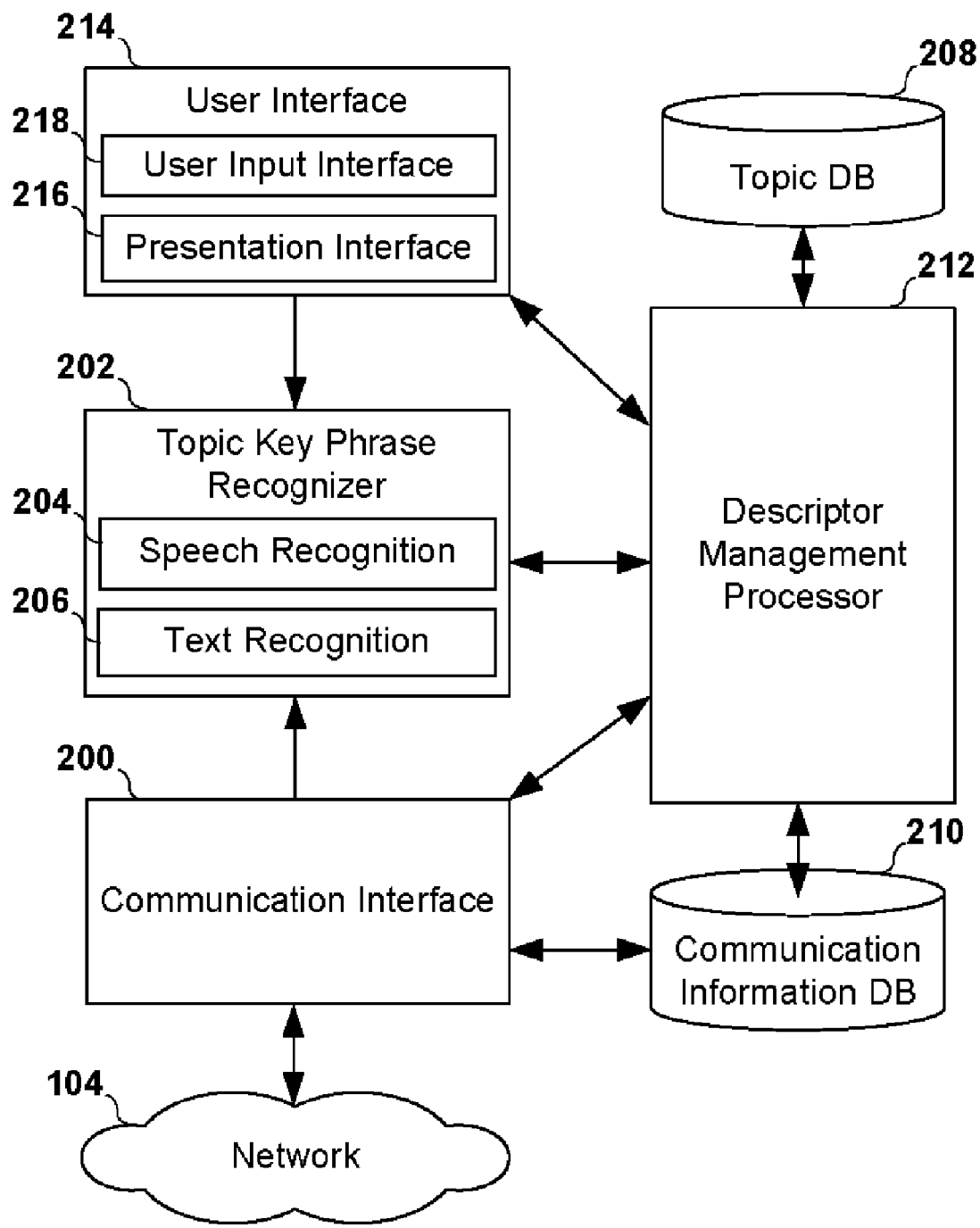
FIG. 2 is a block diagram illustrating a system for presenting topical information referenced during a communication.

FIG. 2 is a block diagram illustrating a system for presenting topical information referenced during a communication. The system may be included in whole or in part in a communication device. In FIG. 2, the system includes means for communicating with a remote endpoint via a communication network. For example, a communication interface 200 provides network communications services for communicating with other communication devices using one more known protocols.

The system also includes means for recognizing a topic key phrase during a communication between a first party and a second party. For example, a topic key phrase recognizer 202 can recognize topic key phrases during a communication.

According to one aspect, the topic key phrase recognizer 202 can include a speech recognition component 204 for recognizing a spoken key phrase from an audio signal during a communication. For example, during a phone conversation, the speech recognition component 204 can recognize a topic key phrase spoken by any of the parties to the conversation. The speech recognition component 204 can recognize natural speech and convert it to text for comparison to topic key phrases stored as text or can recognize natural speech for comparing spoken phrases to topic key phrases stored as audio information.

According to another aspect, the topic key phrase recognizer 202 can include a text recognition component 206 for parsing text from a variety of text-based communication sources, such as e-mail, instant messages, short messaging service (SMS) messages, and the like, and for recognizing topic key phrases in the parsed text. A text recognition component 206 can operate in conjunction with the speech recognition component 204 when natural speech is converted to text for comparison as described above.

The system also includes means for associating one or more topic descriptors with a topic key phrase. For example, the topic database 208 can be used to associate topic key phrases stored in the topic database 208 in a text format and/or in audio format with one or more associated topic descriptors stored in the topic database 208. Topic descriptors provide additional information about the topic key phrase. For example, if the topic key phrase refers to a person, e.g., is a first and/or last name, some topic descriptors can include name, home phone, work phone, e-mail, photo, notes, and like. If the topic key phrase refers to a meeting, some topic descriptors can include participants, time and date, place, purpose, notes, and the like.

Alternatively, the topic database 208 can be used to associate a topic key phrase with one or more topic descriptors, where either or both the topic key phrase and the one or more topic descriptors is not stored in the topic database 208. For example, the topic key phrase and/or topic descriptor can be drawn from information stored in relation to other applications, such as contact management programs (e.g., electronic business cards), calendar programs (e.g., scheduled means), imaging programs (e.g., pictures), task management programs (e.g., to-do items), word processor programs (e.g., notes, documents etc.), communication programs (e.g., previous communications and information about previous communications), and the like. The topic key phrase and topic descriptors can be associated with each other using records in the topic database 208. The actual information for either or both of the topic key phrase and topic descriptors can be referenced in the topic database 208 and stored outside the topic database 208.

The topic database 208 can be stored on the same communication device as the topic key phrase recognizer 202 or can be stored externally and accessed via the communication interface 200 and the network 104. For example, the topic database 208 may be included in database services 108.

The system also includes means for storing information about the communication. For example, the system may include a communication information database 210 for storing information about the communication. The communication information database 210 can communicate with communication interface 200 to store information such as a time and/or date the communication was initiated and/or ended, the parties involved in the communication, a relationship between the parties involved in the communication, and urgency of the call based on any other previously mentioned information, and the like. The communication information database 210 can also store other communication properties, such as the party originating the call and whether the call is a forwarded call or a direct call. The relationship of the parties may be determined based on the communication address, such as a phone number, IP address, MAC address, IM address, or e-mail address, and additional relationship information previously associated with the communication address. Examples of relationships between the parties can include family member, friend, colleague, and acquaintance. Of course, other relationship information may also be used.

The system also includes means for identifying the topic descriptor associated with the recognized topic key phrase, for determining a topic descriptor weight associated with the identified topic descriptor, for determining a topic descriptor presentation threshold based on a relationship between the first party and the second party, and for comparing the topic descriptor weight with the determined topic descriptor presentation threshold. For example, the system can include a descriptor management processor 212. Once the topic key phrase recognizer 202 recognizes a key phrase, the descriptor management processor 212 can identify a topic descriptor associated with the recognized topic key phrase in the topic database 208. The descriptor management processor 212 can then determine a topic descriptor weight associated with the identified topic descriptor. The topic descriptor weight, which is determined based on various factors as discussed further below, can be stored in the topic database 208 and accessed by the descriptor management processor 212. For example, the descriptor management processor 212 can be configured to identify a topic descriptor associated with the topic key phrase by performing a lookup in the topic database 208. The descriptor management processor 212 can then determine a topic descriptor weight associated with the identified topic descriptor by retrieving the topic descriptor weight in conjunction with the performed lookup in the topic database 208.

Each of the topic descriptors may be assigned a topic descriptor weight for determining whether to present that topic descriptor. According to one possible implementation, the topic descriptor weight is a real number between 0 and 1, inclusive. The topic descriptor weight can have a value based on a product of values given to the topic descriptor based on various factors. For purposes of the present description, three factors will be used. It should, however, be understood that any number of factors can be used and that factors different than (or additional to) the three exemplary factors described below may be used.

The three exemplary factors discussed here are importance, privacy, and cost. The importance factor captures how valuable the topic descriptor might be to one or both of the parties to the communication. An importance factor value of a topic descriptor can be pre-set to a default value, such as 0.5, and/or can be determined based on information learned previously from one or both of the parties to the current communication or to a previous communication between the same parties or different parties. The value for each factor can be a real number between 0 and 1 inclusively, such that the product of the values will give the topic descriptor weight as a real number between 0 and 1 inclusively. Any one or more of the importance factor, the privacy factor, and the cost factor may also be given lesser or greater value in comparison to the other factors by applying a weight to that value.

Exemplary factors for determining values for the importance factor and the associated values are given in Table 1 below.

TABLE 1

Exemplary Importance Factor Values

| Information Affecting Importance Factor Value | Value |
|---|---|
| Default (pre-set) value | 0.5 |
| Topic descriptor is manually initiated or retrieved by a party for presentation during a communication | 0.9 |
| Topic descriptor is received from one party and marked as important by the receiving party | 0.8 |
| Topic descriptor is received from two or more parties and marked as important by the receiving party | 0.85 |
| Topic descriptor is received from one other party and not marked as important or unimportant by the present party | 0.7 |
| Topic descriptor is marked as unimportant by the present party | 0.2 |

The cost factor reflects the cost of obtaining the information. For example, information received from a free directory may have a lower cost (because while some effort is required, no money is required) than information received from a credit agency or other information received from a limited source. For example, an oncologist may look up information about another oncologist from the American Society of Clinical Oncology, whereas a lay person would not be able to access such information. The cost factor value of a topic descriptor can be pre-set to a default value, such as 0.5, and/or can be determined based on where the topic descriptor information is stored and the cost of obtaining it. For example, if the topic database 208 is (or references) a limited access or pay-based database for retrieving the topic descriptor, than the cost would be higher and the cost factor value would consequently be lower, such as 0.2. That is, as the cost for obtaining the topic descriptor goes up, the cost factor can go down to lower the topic descriptor weight. In effect, the cost factor is a measure of the "cheapness" of obtaining the topic descriptor. Each topic descriptor can be assigned a cost factor value based on the accessibility of the database it is stored in.

The privacy factor reflects the privacy associated with the topic descriptor. For example, assume the information about a topic descriptor that refers to an individual is:

Formerly of the University of Texas.

Co-chair of the 2005 Autonomous Agents and Multi-Agent Systems Conference.

Met at a scientific panel meeting in DC.

Some of the information, e.g., the first two items above, might be marked sharable, because it would simply help identify a given person. Some other information, e.g., the last item above, may be considered more private because it has little value for others or incorporates some confidential facts. In addition, the privacy factor could vary based on how sensitive the information is. For example, a social security number would be more sensitive than a phone number. The privacy factor of a topic descriptor can be pre-set to a default value, such as 0.5, and/or can be determined based on the privacy level associated with the topic descriptor. The privacy factor for a topic descriptor value gets lower the more private a topic descriptor is. In effect, the privacy factor is a measure of the "revealibility"—the higher the revealibility, the higher the privacy factor value is that is used in the topic descriptor weight determination.

The topic descriptor weight can be calculated by the descriptor management processor 212, for example as a product of the importance factor value, cost factor value, and the privacy factor value. The descriptor management processor 212 may then compare the topic descriptor weight to a descriptor presentation threshold to determine whether to present the topic descriptor. An exemplary topic descriptor weight calculation where the topic descriptor weight is a product of the importance factor value, cost factor value, and the privacy factor value is shown in Table 2 below. In Table 2, the topic descriptors listed are for a topic key phrase that is the first name of the person.

TABLE 2

Exemplary Topic Descriptor Weight Calculation

| Topic Descriptor (where the topic key phrase is a person's first name) | Privacy Factor Value | Cost Factor Value | Importance Factor Value | Topic Descriptor Weight |
|---|---|---|---|---|
| Last Name | 0.9 | 0.9 | 0.9 | 0.729 |
| Home Phone | 0.1 | 0.2 | 0.8 | 0.016 |
| Work Phone | 0.6 | 0.3 | 0.8 | 0.144 |
| E-mail Address | 0.5 | 0.2 | 0.6 | 0.060 |
| Photo | 0.3 | 0.1 | 0.9 | 0.027 |

The descriptor management processor 212 is also configured to determine a topic descriptor presentation threshold based on a relationship between parties to the communication, e.g., as retrieved from the communication information database 210, as will be discussed further below. For example, the descriptor management processor 212 can determine a topic descriptor presentation threshold by determining the relationship between the first party and the second party based on a relationship identifier read from the communication information database 210. As mentioned above, examples of relationships between the parties can include family member, friend, colleague, and acquaintance. Table 3 below is a table with exemplary topic descriptor presentation thresholds based on a relationship between parties to a communication.

TABLE 3

Exemplary Topic Descriptor Presentation Thresholds Based on a Relationship between Parties

| Relationship Between Parties | Family | Friend | Colleague | Acquaintance | Unknown |
|---|---|---|---|---|---|
| Topic Descriptor Presentation Threshold | 0.1 | 0.3 | 0.5 | 0.7 | 0.9 |

In addition, the descriptor management processor 212 can determine a topic descriptor presentation threshold based on properties of the communication read from the communication information database 210. For example, the descriptor management processor 212 can determine a topic descriptor presentation threshold based on communication properties retrieved from the communication information database 210, such as the party originating the call and/or whether the call is a forwarded call or a direct call. Table 4 below is a table with exemplary topic descriptor presentation thresholds based on a relationship between parties to a communication and properties of the communication. In Table 4, the term "party-originated" refers to the calls originated by the party using the communication device where the topic descriptor would be presented and the option to send the topic descriptor may be presented while the term "other-party-originated" refers to the calls originated by another party to the communication.

TABLE 4

Exemplary Topic Descriptor Presentation Thresholds Based on Relationship and Properties of the Communication

| Communication Property (Weight) | Relationship Between Parties (Weight) | | | | |
| --- | --- | --- | --- | --- | --- |
| | Family (0.1) | Friend (0.3) | Colleague (0.5) | Acquaintance (0.7) | Unknown (0.9) |
| Party-Originated Direct Call (0.1) | 0.01 | 0.03 | 0.05 | 0.07 | 0.09 |
| Party-Originated Forwarded Call (0.3) | 0.03 | 0.09 | 0.15 | 0.21 | 0.27 |
| Other-Party-Originated Forwarded Call (0.5) | 0.05 | 0.15 | 0.25 | 0.35 | 0.45 |
| Other-Party-Originated Direct Call (0.7) | 0.07 | 0.21 | 0.35 | 0.49 | 0.63 |
| Unknown (0.9) | 0.09 | 0.27 | 0.45 | 0.63 | 0.81 |

As can be appreciated with respect to Tables 3 and 4, the topic descriptor presentation threshold based on the relationship between parties and/or communication property may be assigned a weight as a real number between 0 and 1, inclusive. In each case, the lower the weight, the greater the significance, because a lower threshold would result in more descriptors being presented to a party (and optionally sent to the other party). In the examples given, the values for relationship between parties are assigned as 0.1, 0.3, 0.5, 0.7, and 0.9, respectively, for family, friend, colleague, acquaintance, and unknown. Similarly, the values for communication property are assigned as 0.1, 0.3, 0.5, 0.7, and 0.9, respectively, for a party-originated direct call, party-originated forwarded call, other-party-originated forwarded call, other-party-originated direct call, and unknown. As illustrated in Table 4, the topic descriptor presentation threshold can be determined as a function of the weight given to a relationship between parties and the weight given to a communication property that are in effect for the given communication. In Table 4, the product of the weight given to a relationship between parties and the weight given to a communication property are used to calculate the topic descriptor presentation thresholds shown throughout the table.

The descriptor management processor 212 compares the topic descriptor weight with the determined topic descriptor presentation threshold and determines whether to present the topic descriptor based on the comparison. For example, when the topic descriptor weight exceeds the determined topic descriptor presentation threshold, the topic descriptor can be presented via a user interface on the same communication device or can be sent via communication interface 200 to a user interface for another communication device participating in the communication.

According to one implementation, the descriptor management processor 212 can be configured to identify another topic descriptor associated with the topic key phrase, to determine a topic descriptor weight associated with the other identified topic descriptor, to compare the topic descriptor weight associated with the other identified topic descriptor with the determined topic descriptor presentation threshold, and to automatically forward the topic descriptors to the user interface for presenting based on each respective comparison. For example, two or more topic descriptors can be presented to a user. According to one implementation, only those topic descriptors having a topic descriptor weight that exceeds the topic descriptor presentation threshold are presented. According to another implementation, all associated topic descriptors are presented to the user, but those topic descriptors having a topic descriptor weight that exceeds the topic descriptor presentation threshold are indicated prominently to the user. By way of example, assume that the topic key phrase recognized by the topic key phrase recognizer is the name "Mike Q." and that the topic descriptors and corresponding topic descriptor weights listed in Table 2 are associated with Mike Q. Assume also that the topic descriptor presentation threshold is 0.125. As can be appreciated, both the "last name" and the "work number" topic descriptors have a topic descriptor weight that exceeds the topic descriptor presentation threshold and can be presented to the user either alone or can be presented with an indication that prominently distinguishes these two topic descriptors from the other topic descriptors.

The system also includes means for presenting the topic descriptor based on the comparison. For example, the system can include a user interface 214 that includes a presentation interface 216 for presenting information to a user, such as a display, speaker, and the like, for presenting the topic descriptor in conjunction with the descriptor management processor 212 based on the comparison. User interface 214 can also include a user input interface for receiving user input, such as a keypad, keyboard, touch screen, microphone, and the like. According to one implementation, the user interface is configured to receive a preference from a user-party for sending the topic descriptor to another party and the descriptor management processor 212 is configured to determine whether to send the topic descriptor based on the received preference.

According to another implementation, the descriptor management processor 212 can be configured to receive a preference from a user-party for selecting a preferred topic descriptor for sending to another party from among the presented topic descriptors and to determine whether to send the selected topic descriptor to the other party based on the received preference.

The descriptor management processor 212 may also be configured to adjust the topic descriptor weight based on the received preference for sending the topic descriptor. That is, the topic descriptor weight is adjusted up or down based on a party's decision as to whether to send the topic descriptor to another party to the communication. The new topic descriptor weight can then be used in future topic descriptor presentation decisions, which therefore provides a "learning effect" that is based on user behavior.

For example, based on the current topic descriptor weights, the system can present the associated topic descriptors and generate a suggestion for a user-party as to what topic descriptors to send to another party to the communication. If the user-party accepts the automatically generated suggestions for what to send for a given topic key phrase, then the topic descriptor weights remain unchanged. If, however, the user-party explicitly selects a particular topic descriptor to be sent for a given topic key phrase, the topic descriptor weight can be adjusted. According to one implementation, the topic descriptor weight, w, is adjusted when the user-party explicitly selects a particular topic descriptor such that the new topic descriptor weight, w', is determined according to the relation: $w'=w+a*(1-w)$, where a is the positive learning rate represented by a positive fraction, such as 0.1. If the user-party explicitly deselects a presented topic descriptor, i.e., does not allow it to be sent, the topic descriptor weight w is adjusted such that the new topic descriptor weight w' is determined according to the relation: w'=w*(1−b), where b is the negative learning rate, again represented by a positive fraction, such as 0.1. Table 5 below illustrates learning based on user-party input and the resulting adjustments made to the topic descriptor weights as compared to the initial topic descriptor weights in Table 2.

TABLE 5

Adjustments Made to the Topic Descriptor Weights Base on Learning

| Topic Descriptor (From Table 2) | Initial Topic Descriptor Weight (From Table 2) | Presented to User-Party? | User-Party Selects to Send? | New Weight | Presented to User-Party Next Time? |
|---|---|---|---|---|---|
| Last Name | 0.729 | Yes | Yes | 0.729 | Yes |
| Home Phone | 0.016 | No | No | 0.016 | No |
| Work Phone | 0.144 | Yes | No | 0.130 | No |
| E-mail Address | 0.060 | No | Yes | 0.154 | Yes |
| Photo | 0.027 | No | No | 0.027 | No |

With reference to Table 5, a topic descriptor presentation threshold of 0.135 is used by way of example. As can be appreciated, topic descriptors with an initial topic descriptor weight (taken from Table 2) of greater then 0.135 are presented to the user party as indicated in the "Presented to User-Party" column. The learning effect described above is also illustrated in Table 5. With reference to the "User-Party Selects" column, whenever the user selection differs from what is presented to the user-party, the initial topic descriptor weight is adjusted as indicated in the "New Weight" column. In particular, those entries indicated in boldface type have been adjusted. For example, the user was presented with the "work phone" topic descriptor (because it exceeded the threshold of 0.135) but did not select it. As a result, the initial topic descriptor weight was adjusted downward according to the relation w'=w*(1−b), resulting in a new weight of 0.130. Accordingly, as indicated in the "Presented To User-Party Next Time" column, this topic descriptor will not be selected next time assuming the same topic descriptor presentation threshold of 0.135 is used again. Similarly, the e-mail address topic descriptor, which was not presented to the user-party because the topic descriptor weight is below the topic descriptor presentation threshold value, or was presented but was not prominently indicated, was selected to be sent by the user-party using an appropriate location and selection means. Consequently, the topic descriptor weight is adjusted upwards according to the relation w'=w+a*(1−w), resulting in a new weight of 0.154. Accordingly, as indicated in the "Presented To User-Party Next Time" column, this topic descriptor will be selected next time assuming the same topic descriptor presentation threshold of 0.135 is used again. Hence, the topic descriptor weights for the work phone and e-mail address associated with the particular topic key phrase are adjusted based on learning from the user-party input.

According to yet another implementation, the topic descriptor presentation threshold may be adjusted based on learning in addition to or in lieu of adjusting the topic descriptor weights. It should also be pointed out here that the methods and systems described herein may be performed without adjusting either the topic descriptor presentation threshold or topic descriptor weight and may instead rely on pre-set values. With respect to adjusting the topic descriptor presentation threshold, the relative significance given to different relationships between parties and communication properties can be learned by adjusting the threshold. Here, the individual topic key phrases are less important.

One exemplary technique for adjusting the topic descriptor presentation threshold will be discussed here. It should be understood that various other techniques may be employed without departing from the subject matter described herein. As a first consideration, when the relationship between parties is unknown and the communication properties are unknown, no adjustments are made to the topic descriptor presentation threshold. When a user selects to send a topic descriptor that has not been presented (or is not prominently indicated), the current threshold, T, is adjusted downward to an adjusted threshold, T'. To determine T', a desired threshold, U, is determined according to the relation U=T*(1−q), where q is a positive fraction, such as 0.1, representing the negative learning rate. When a user does not select a topic descriptor that has been presented, the current threshold T is adjusted upward to an adjusted threshold T'. In this case, the desired threshold U is determined according to the relation U=T+r*(1−T), where r is a positive fraction, such as 0.1, representing the positive learning rate. In either case, a correction factor c is determined according to the relation c=√(U/T).

When a relationship between parties is unknown, but a communication property P is known, the weight P assigned to the communication property is updated to P' according to the relation P'=P*$C^2$. More particularly, the adjustment made to the threshold to determine T' is a result of the adjustment to the communication property weight, i.e., from P to P', and the resulting change in the product of the new communication property weight P' and the relationship weight R, such that T'=P'*R.

If the relationship between parties is known and the communication property is unknown, the weight R of the relationship is updated to R' according to the relation R'=R*$c^2$. More particularly, the adjustment made to the threshold to determine T' is a result of the adjustment to the relationship weight, i.e., from R to R', and the resulting change in the product of the property weight P and the new relationship weight R', such that T'=P*R'.

If the relationship between parties is known and the communication property is known, the relationship weight R is adjusted to R' according to the relation R'=R*$c^2$ and the communication property weight P is adjusted to P' according to the relation P'=P*$c^2$. More particularly, the adjustment made to the threshold to determine T' is a result of the adjustment to both the relationship weight, i.e., from R to R', and the adjustment to the communication property weight, i.e., from P to P'. The result is a change in the product of the new property weight P' and the new relationship weight R', such that T'=P'*R'. Table 6 below illustrates adjusting topic descriptor presentation thresholds based on learned adjustments to the "friend" relationship weight and an "other-party-originated forwarded call" communication property weight. The changed thresholds are shown in boldface italics.

TABLE 6

Adjustments Made to Topic Descriptor Presentation Thresholds Based on Learning

| Communication Property (Weight) | Relationship Between Parties (Weight) | | | | |
|---|---|---|---|---|---|
| | Family (0.10) | *Friend* *(0.27)* | Colleague (0.50) | Acquaintance (0.70) | Unknown (0.90) |
| Party-Originated Direct Call (0.10) | 0.010 | *0.027* | 0.050 | 0.070 | 0.090 |
| Party-Originated Forwarded Call (0.30) | 0.030 | *0.081* | 0.150 | 0.210 | 0.270 |
| Other-Party-Originated Forwarded Call (0.50) | 0.050 | *0.135* | 0.250 | 0.350 | 0.450 |
| *(0.63)* Originated Directed Call *(0.63)* | 0.063 | *0.170* | *0.315* | *0.441* | *0.567* |
| Unknown (0.90) | 0.090 | *0.243* | 0.450 | 0.630 | 0.810 |

Referring again to Table 4, the initial threshold for a friend in a direct call originated by the other party is 0.21. After a user-party selects a non-presented topic descriptor to be sent during the communication, the desired threshold U is determined as $U=T*(1-q)=0.21*(1-0.1)=0.189$. It therefore follows that the correction factor $c=\sqrt{(U/T)}=\sqrt{0.189/0.21}=0.949$, the adjusted relationship weight $R'=R*c^2=0.30*0.949^2=0.27$, and the adjusted properties weight $P'=P*c^2=0.70*0.949^2=0.63$. As a result of adjusting the relationship weight R' and properties weight P', the topic descriptor presentation threshold values shown in boldface italics in Table 6 are adjusted as compared to the initial values shown in Table 4.

According to another embodiment, the system for presenting topical information referenced during a communication may use a fixed topic descriptor presentation threshold value, such as 0.5. That is, a relationship between the parties to the communication and/or the communication properties may not necessarily be taken into account. Each associated topic descriptor is compared to the fixed topic descriptor presentation threshold value and presented when the topic descriptor weight exceeds the topic descriptor presentation threshold value. The topic descriptor(s) having weights exceeding the topic descriptor presentation threshold value are presented via a user interface and a preference is received via the user interface from the user-party regarding sending the topic descriptor to another party to the communication. The descriptor management processor can adjust the topic descriptor weight based on the received preference for sending the topic descriptor, as discussed above.

Figure 3:
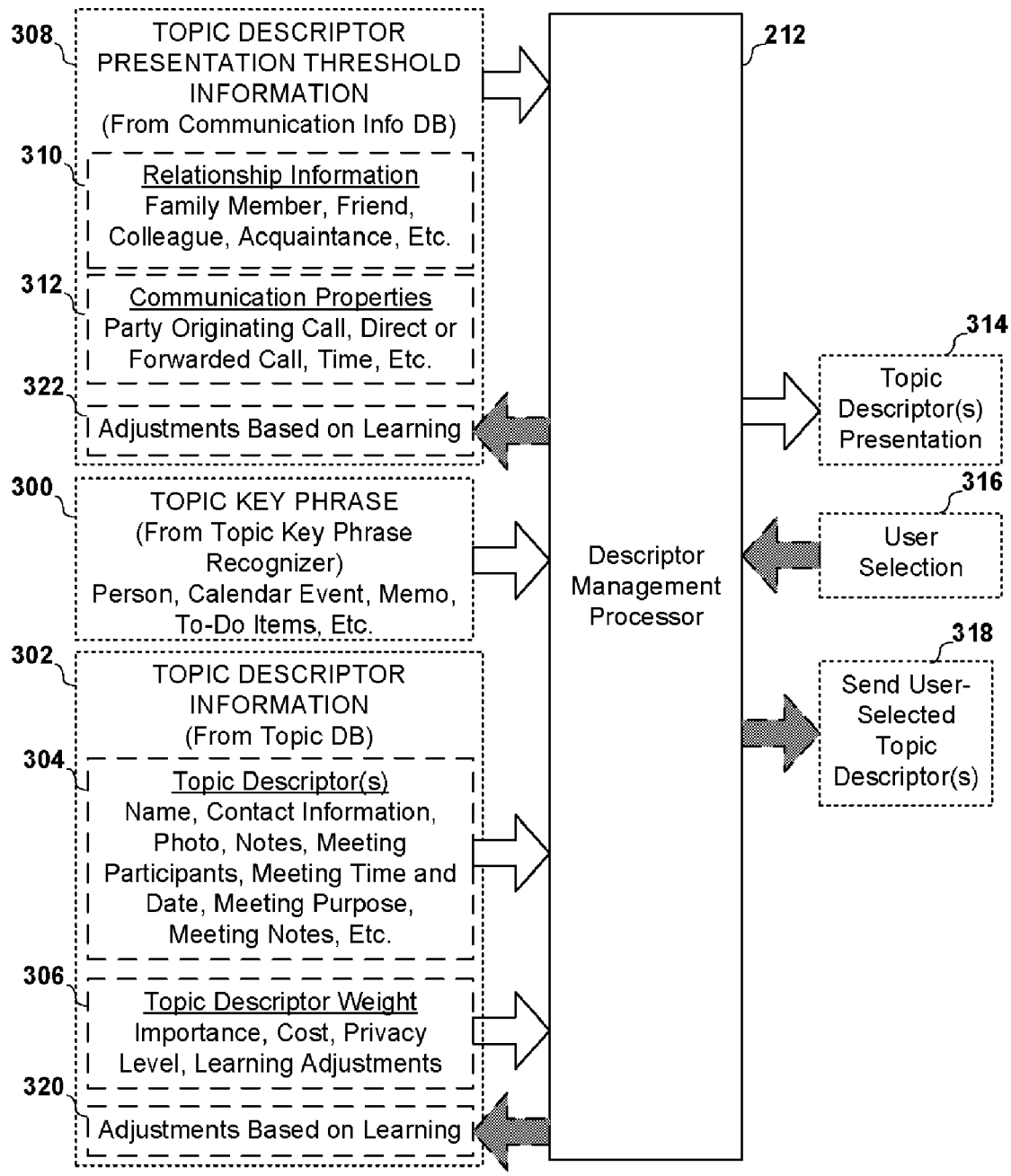
FIG. 3 is a block diagram illustrating data processed by the descriptor management processor for presenting topical information referenced during a communication.
Figure 4:
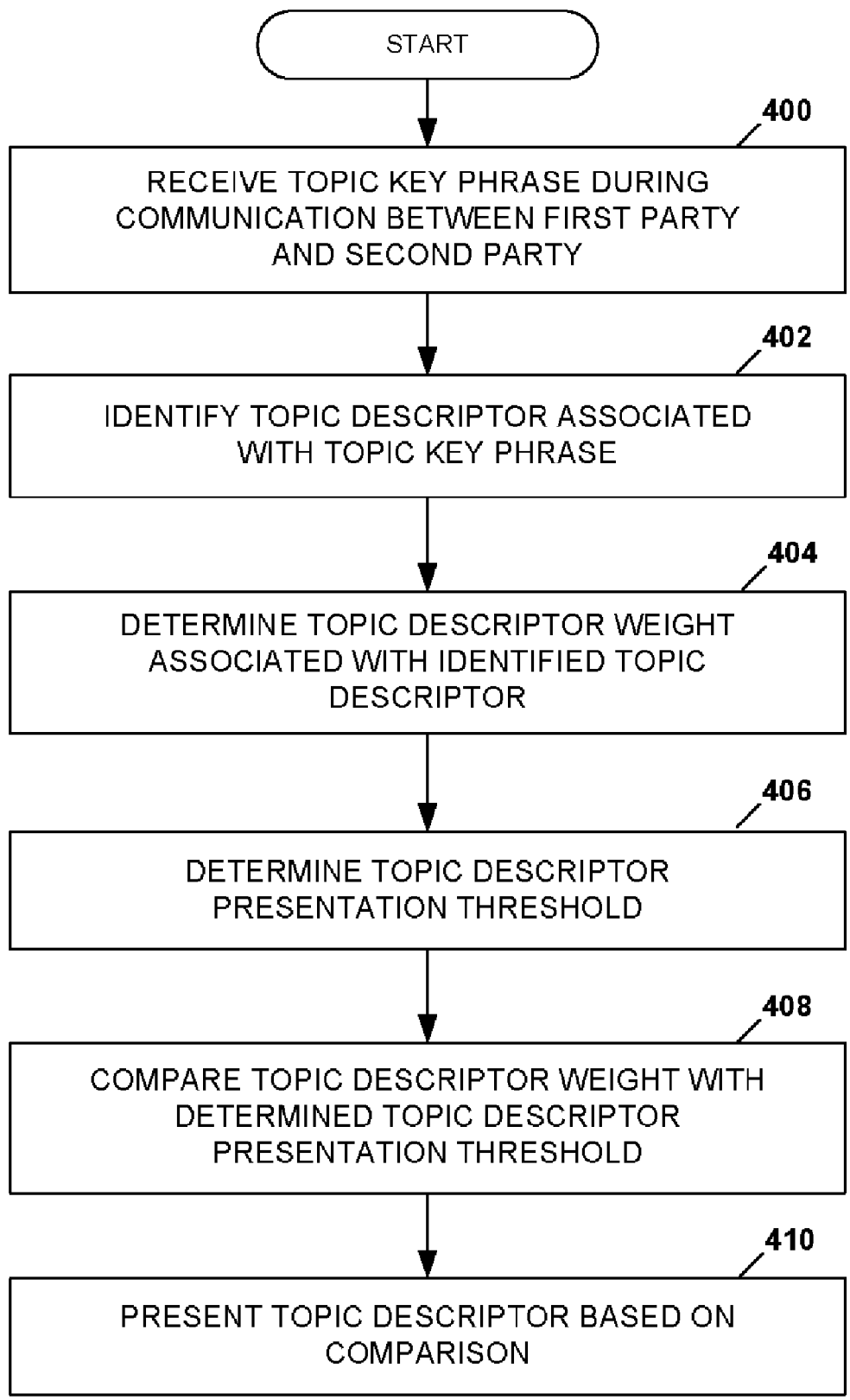
FIG. 4 is a flow diagram illustrating a method for presenting topical information referenced during a communication.

FIG. 3 is a block diagram illustrating data processed by the descriptor management processor for presenting topical information referenced during a communication. FIG. 4 and is a flow diagram illustrating a method for presenting topical information referenced during a communication. With reference to FIGS. 2, 3, and 4, a topic key phrase 300 is received during a communication between a first party and a second party in block 400. For example, the topic key phrase recognizer 202 can recognize a topic key phrase and forward the recognized topic key phrase to the descriptor management processor 212 for processing. In block 402, a topic descriptor 304 associated with the topic key phrase 300 is identified. The topic descriptor 304 can be identified from stored topic descriptor information 302, for example in topic database 208. In block 404, a topic descriptor weight 306 associated with the identified topic descriptor 304 is determined. For example, the topic descriptor weight can be calculated based on importance, privacy, and cost factors, as described above. In block 406, a topic descriptor presentation threshold 308 is determined. The topic descriptor presentation threshold 308 can be a fixed value or can be based on a relationship 310 between parties to the communication. Additionally, the topic descriptor presentation threshold 308 can be based on communication properties 312. In block 408, the topic descriptor weight 306 is compared with the determined topic descriptor presentation threshold 308. In block 410, the topic descriptor 304 is presented 314 based on the comparison.

As discussed above, additional actions may then optionally be taken, as indicated by the darker arrows in FIG. 3. Referring to FIG. 3, a user may select 316 from among the topic descriptor(s) presented 314 to the user-selected topic descriptors may be sent 318 to another party. Adjustments 320 may be made to the topic descriptor weight 306 based on learning from the user selection 316. Alternatively, or in addition, adjustments 322 may be made to the topic descriptor presentation threshold 308 based on learning from the user selection 316.

Figure 5:
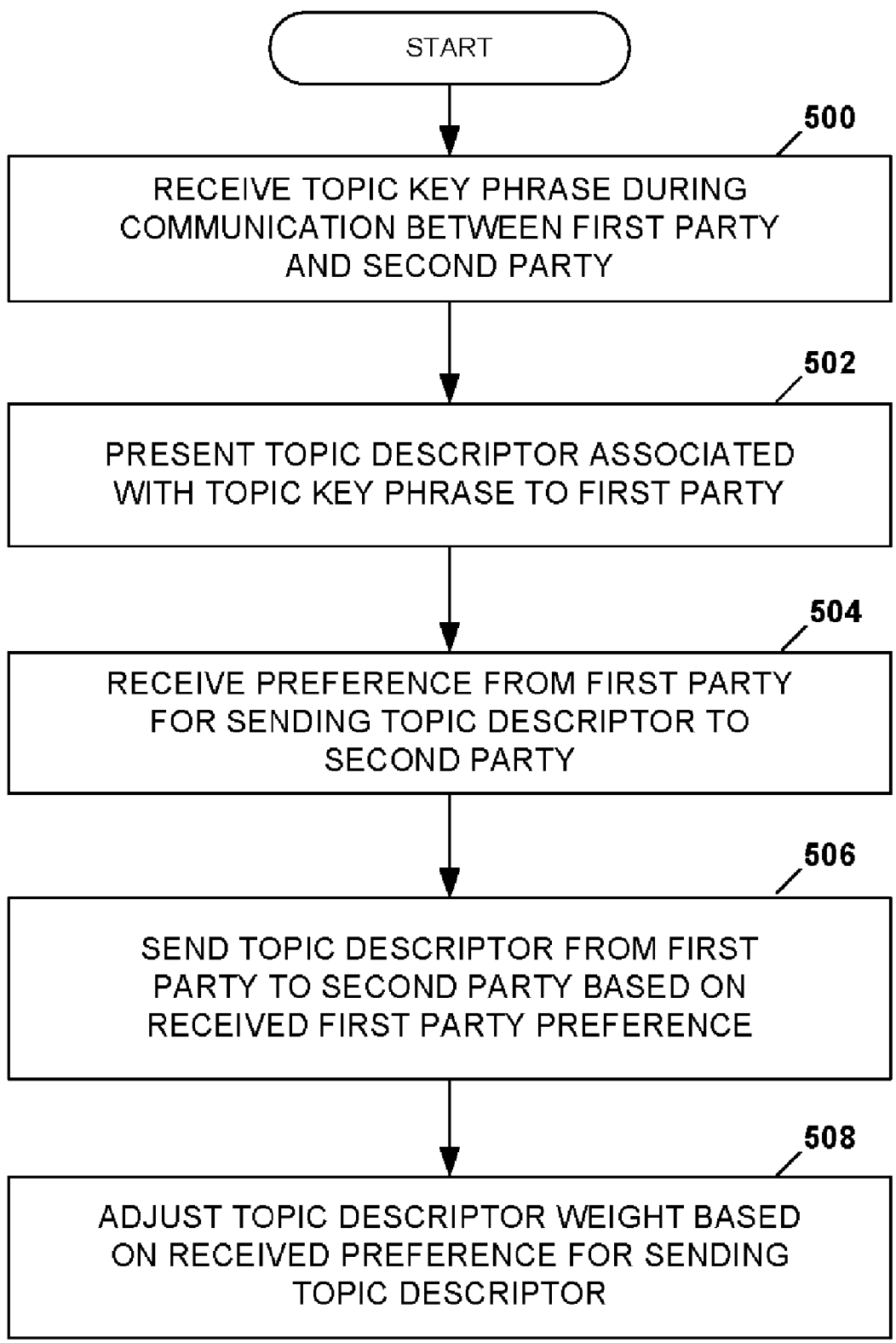
FIG. 5 is a flowchart illustrating another method for presenting topical information referenced during a communication.

FIG. 5 is a flowchart illustrating a method for presenting topical information referenced during a communication. In block 500, a topic key phrase 300 is received during a communication between a first party and a second party. In block 502, a topic descriptor 304 associated with the topic key phrase is presented to the first party. The topic descriptor 304 has an associated topic descriptor weight 306. In block 504, a preference 316 is received from the first party for sending the topic descriptor 304 to the second party. In block 506, the topic descriptor 304 is sent 318 from the first party to the second party based on the received first party preference 316. In the block 508, the topic descriptor weight 306 is adjusted 320 based on the received preference 316 for sending the topic descriptor.

The disclosed approach for learning based on user input may be employed based on any number of parameters, where each parameter defines a dimension. That is, the learning approach discussed above can be used with any number of dimensions of information. The dimensions are divided into one "main" dimension, which describes the action to be taken, and another "preference" dimension, which can combine the effect of a number of dimensions, thus reducing the overall number of dimensions and the complexity of the calculation. The main dimension is typically large (i.e., has several possible values, such as the set of possible topic descriptors for each topic key phrase). The preference dimension captures the preference for each value of the main dimension in the form of a topic descriptor weight and/or the topic descriptor presentation threshold. The remaining dimensions are applied as a way to adjust the thresholds under which the preference dimension is applied. According to one imple mentation, the learning approach may be characterized generally by the following actions:

1. Select a main dimension of an action.

2. Select a preference dimension that is used to store preferences for each instance of the main dimension; optionally the preference dimension could be initialized as a product of other dimensions.

3. Assign weights to the above preference dimension, these weights being interpreted as preference hints.

4. Assign weights to the remaining one or more dimensions, these weights being interpreted as threshold hints.

5. Determine a threshold for an action instance based on a product of the abovementioned threshold hints.

6. Predict the action instance as being preferred by the user if the weight computed for it exceeds the threshold computed for it.

7. Observe whether the user accepts the suggestion or prediction of user preferences.

8. Adjust the weights corresponding to the preference hints and the weights corresponding to the threshold hints in the case that the user positively or negatively overrides the prediction made by the above step.

It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for presenting topical information referenced during a communication, the method comprising:
    receiving a topic key phrase during a communication between a first party and a second party;
    identifying a topic descriptor associated with the topic key phrase;
    determining a topic descriptor weight associated with the identified topic descriptor;
    determining a topic descriptor presentation threshold, wherein the topic descriptor presentation threshold is based on a relationship between the first party and the second party;
    comparing the topic descriptor weight with the determined topic descriptor presentation threshold; and
    presenting the topic descriptor based on the comparison.

2. The method of claim 1 wherein receiving a topic key phrase during a communication between a first party and a second party includes detecting the topic key phrase from an audio signal during the communication.

3. The method of claim 1 wherein receiving a topic key phrase during a communication between a first party and a second party includes detecting the topic key phrase from a text message during the communication.

4. The method of claim 1 wherein identifying a topic descriptor associated with the topic key phrase includes performing a lookup in a topic database.

5. The method of claim 4 wherein determining a topic descriptor weight associated with the identified topic descriptor includes retrieving the topic descriptor weight in conjunction with the performed lookup in the topic database.

6. The method of claim 4 wherein the topic descriptor weight is determined based on at least one of an importance factor, a privacy factor, and a cost factor.

7. The method of claim 6 wherein at least one of the importance factor, the privacy factor, and the cost factor is weighted.

8. The method of claim 1 wherein determining a topic descriptor presentation threshold includes determining the relationship between the first party and the second party based on a relationship identifier read from a communication information database.

9. The method of claim 8 wherein determining a topic descriptor presentation threshold further includes determining the topic descriptor presentation threshold based on properties of the communication between the first party and the second party read from a communication information database.

10. The method of claim 1 wherein presenting the topic descriptor based on the comparison includes presenting the topic descriptor to the first party via a user interface.

11. The method of claim 1 further comprising:
    receiving a preference from the first party for sending the topic descriptor to the second party; and
    sending the topic descriptor from the first party to the second party based on the received first party preference.

12. The method of claim 11 further comprising adjusting at least one of the topic descriptor weight and the topic descriptor presentation threshold based on the received preference for sending the topic descriptor.

13. The method of claim 1 further comprising:
    identifying another topic descriptor associated with the topic key phrase;
    determining a topic descriptor weight associated with the identified at least one other topic descriptor;
    comparing the topic descriptor weight associated with the identified at least one other topic descriptor with the determined topic descriptor presentation threshold; and
    presenting the topic descriptor and the at least one other topic descriptor based on each respective comparison.

14. The method of claim 13 further comprising:
    receiving a preference from the first party for selecting a preferred topic descriptor from the topic descriptor and the at least one other topic descriptor for sending to the second party;
    sending the selected topic descriptor from the first party to the second party based on the received first party preference; and
    adjusting at least one respective topic descriptor weight based on the selection of the preferred topic descriptor.

15. A method for presenting topical information referenced during a communication, the method comprising:
    receiving a topic key phrase during a communication between a first party and a second party;
    presenting to the first party a topic descriptor associated with the topic key phrase, the topic descriptor having an associated topic descriptor weight, wherein the associated topic descriptor is presented based on a comparison of the associated topic descriptor weight and a topic descriptor presentation threshold determined based on a relationship between the first party and the second party;
    receiving a preference from the first party for sending the topic descriptor to the second party;

sending the topic descriptor from the first party to the second party based on the received first party preference; and adjusting the topic descriptor weight based on the received preference for sending the topic descriptor.

16. A computer program product comprising computer executable instructions embodied in a computer-readable storage medium for performing steps comprising:

receiving a topic key phrase during a communication between a first party and a second party;

identifying a topic descriptor associated with the topic key phrase;

determining a topic descriptor weight associated with the identified topic descriptor;

determining a topic descriptor presentation threshold, wherein the topic descriptor presentation threshold is based on a relationship between the first party and the second party;

comparing the topic descriptor weight with the determined topic descriptor presentation threshold; and presenting the topic descriptor based on the comparison.

17. The computer program product of claim 16 further comprising computer executable instructions embodied in a computer-readable medium for performing steps comprising:

receiving a preference from the first party for sending the topic descriptor to the second party; and sending the topic descriptor from the first party to the second party based on the received first party preference.

18. The computer program product of claim 17 further comprising computer executable instructions embodied in a computer-readable medium for adjusting the topic descriptor weight based on the received preference for sending the topic descriptor.

19. A computer program product comprising computer executable instructions embodied in a computer-readable storage medium for performing steps comprising:

receiving a topic key phrase during a communication between a first party and a second party;

presenting to the first party a topic descriptor associated with the topic key phrase, the topic descriptor having an associated topic descriptor weight, wherein the associated topic descriptor is presented based on a comparison of the associated topic descriptor weight and a topic descriptor presentation threshold determined based on a relationship between the first party and the second party;

receiving a preference from the first party for sending the topic descriptor to the second party;

sending the topic descriptor from the first party to the second party based on the received first party preference; and adjusting the topic descriptor weight based on the received preference for sending the topic descriptor.

20. A system for presenting topical information referenced during a communication, the system comprising:

means for communicating with a remote endpoint via a communication network;

means for recognizing a topic key phrase during a communication between a first party and a second party;

means for associating a topic descriptor with the topic key phrase;

means for storing information about the communication;

means for identifying the topic descriptor associated with the recognized topic key phrase, for determining a topic descriptor weight associated with the identified topic descriptor, for determining a topic descriptor presentation threshold based on a relationship between the first party and the second party, and for comparing the topic descriptor weight with the determined topic descriptor presentation threshold; and means for presenting the topic descriptor based on the comparison, said means for presenting including a presentation interface for presenting information to a user.

21. A system for presenting topical information referenced during a communication, the system comprising:

a communication interface for communicating with a remote endpoint via a communication network;

a topic key phrase recognizer for recognizing a topic key phrase during a communication between a first party and a second party;

a topic database for associating a topic descriptor with the topic key phrase;

a communication information database for storing information about the communication;

a descriptor management processor for identifying the topic descriptor associated with the recognized topic key phrase in the topic database, for determining a topic descriptor weight associated with the identified topic descriptor, for determining a topic descriptor presentation threshold based on a relationship between the first party and the second party retrieved from the communication information database, and for comparing the topic descriptor weight with the determined topic descriptor presentation threshold; and a user interface for presenting the topic descriptor in conjunction with the descriptor management processor based on the comparison.

22. The system of claim 21 wherein the topic key phrase recognizer is configured to detect the topic key phrase from an audio signal during the communication.

23. The system of claim 21 wherein the topic key phrase recognizer is configured to detect the topic key phrase from a text message during the communication.

24. The system of claim 21 wherein the descriptor management processor is configured to identify the topic descriptor associated with the topic key phrase by performing a lookup in a topic database.

25. The system of claim 24 wherein the descriptor management processor is configured to determine a topic descriptor weight associated with the identified topic descriptor by retrieving the topic descriptor weight in conjunction with the performed lookup in the topic database.

26. The system of claim 24 wherein the descriptor management processor is configured to determine the topic descriptor weight based on at least one of an importance factor, a privacy factor, and a cost factor.

27. The system of claim 26 wherein at least one of the importance factor, the privacy factor, and the cost factor is weighted.

28. The system of claim 21 wherein the descriptor management processor is configured to determine a topic descriptor presentation threshold by determining the relationship between the first party and the second party based on a relationship identifier read from the communication information database.

29. The system of claim 28 wherein the descriptor management processor is configured to determine a topic descriptor presentation threshold based on properties of the communication between the first party and the second party read from the communication information database.

30. The system of claim 21 wherein the user interface is configured to receive a preference from the first party for sending the topic descriptor to the second party and the descriptor management processor is configured to determine whether to send the topic descriptor from the first party to the second party based on the received first party preference.

31. The system of claim 30 wherein the descriptor management processor is configured to adjust at least one of the topic descriptor weight and the topic descriptor presentation threshold based on the received preference for sending the topic descriptor.

32. The system of claim 21 wherein the descriptor management processor is configured to:
   identify another topic descriptor associated with the topic key phrase;
   determine a topic descriptor weight associated with the identified at least one other topic descriptor;
   compare the topic descriptor weight associated with the identified at least one other topic descriptor with the determined topic descriptor presentation threshold; and
   forward the topic descriptor and the at least one other topic descriptor to the user interface for presenting based on each respective comparison.

33. The system of claim 32 wherein the descriptor management processor is configured to:
   receive a preference from the first party for selecting a preferred topic descriptor from the topic descriptor and the at least one other topic descriptor for sending to the second party;
   determine whether to send the selected topic descriptor from the first party to the second party based on the received first party preference; and
   adjust at least one respective topic descriptor weight based on the selection of the preferred topic descriptor.

34. A system for presenting topical information referenced during a communication, the system comprising:
   a communication interface for communicating with a remote endpoint via a communication network;
   a topic key phrase recognizer for recognizing a topic key phrase during a communication between a first party and a second party;
   a descriptor management processor for determining a topic descriptor associated with the topic key phrase, the topic descriptor having an associated topic descriptor weight, wherein the associated topic descriptor is determined based on a comparison of the associated topic descriptor weight and a topic descriptor presentation threshold determined based on a relationship between the first party and the second party;
   a user interface for presenting to the first party the topic descriptor based on the associated weight and for receiving a preference from the first party for sending the topic descriptor to the second party;
   wherein the descriptor management processor adjusts the topic descriptor weight based on the received preference for sending the topic descriptor.

* * * * *

UNITED STATES PATENT AND TRADEMARK OFFICE
CERTIFICATE OF CORRECTION

PATENT NO.        : 7,606,856 B2                                    Page 1 of 1
APPLICATION NO.   : 11/164077
DATED             : October 20, 2009
INVENTOR(S)       : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Twelfth Day of October, 2010

David J. Kappos
*Director of the United States Patent and Trademark Office*